(12) United States Patent
Ficyk

(10) Patent No.: US 10,234,060 B1
(45) Date of Patent: Mar. 19, 2019

(54) CABLE TENSION ADJUSTER

(71) Applicant: L&P Property Management Company, South Gate, CA (US)

(72) Inventor: Eugene John Ficyk, Livonia, MI (US)

(73) Assignee: L&P PROPERTY MANAGEMENT COMPANY, South Gate, CA (US)

( * ) Notice: Subject to any disclaimer, the term of this patent is extended or adjusted under 35 U.S.C. 154(b) by 0 days.

(21) Appl. No.: 15/822,571

(22) Filed: Nov. 27, 2017

(51) Int. Cl.
*F16L 3/18* (2006.01)
*F16C 1/26* (2006.01)

(52) U.S. Cl.
CPC . *F16L 3/18* (2013.01); *F16C 1/26* (2013.01)

(58) Field of Classification Search
CPC ... F16L 3/18; F16L 1/101; F16L 1/226; F16L 1/26; Y10T 74/2045; Y10T 74/20456; Y10T 74/20462; Y10T 74/20468
See application file for complete search history.

(56) References Cited

U.S. PATENT DOCUMENTS

| | | | | |
|---|---|---|---|---|
| 1,450,709 | A * | 4/1923 | Bayles | E21C 11/00 254/133 A |
| 2,363,228 | A | 11/1944 | Cade | |
| 4,829,845 | A | 5/1989 | Suzuki | |
| 4,838,109 | A | 6/1989 | Stewart | |
| 4,869,123 | A | 9/1989 | Stocker | |
| 5,359,909 | A | 11/1994 | Ito et al. | |
| 5,377,556 | A | 1/1995 | Byrnes | |
| 5,560,259 | A | 10/1996 | Reasoner | |
| 5,653,148 | A * | 8/1997 | Reasoner | F16C 1/226 403/327 |
| 5,673,596 | A | 10/1997 | Lu | |
| 5,682,797 | A * | 11/1997 | Kelley | F16C 1/226 403/11 |
| 5,709,132 | A | 1/1998 | Irish et al. | |
| 5,921,143 | A * | 7/1999 | Castillo | F16C 1/226 74/501.5 R |
| 6,056,020 | A * | 5/2000 | Malone | F16C 1/101 138/155 |
| 6,102,609 | A * | 8/2000 | Tsuge | F16C 1/101 403/301 |

(Continued)

FOREIGN PATENT DOCUMENTS

| | | | |
|---|---|---|---|
| EP | 2184501 | A1 | 5/2010 |
| JP | 4798975 | B2 | 10/2011 |

*Primary Examiner* — Michael E Gallion
(74) *Attorney, Agent, or Firm* — Michael Best & Friedrich LLP

(57) ABSTRACT

A cable tension adjuster for adjusting tension between two cable sections includes a junction box. A slider is disposable within the junction box and includes a first slider wall, a cable coupling port opposite the first slider wall configured for coupling a first inner cable of a first cable section, and a second slider wall adjacent the cable coupling port. The first and second slider walls together partially define an internal cavity therebetween. A spool is disposable within the internal cavity and is couplable to a second inner cable of a second cable section. The spool includes a plurality of spool teeth. A biasing member is disposable within the internal cavity between the first slider wall and the spool. A locking clip is disposable within an aperture formed in the slider and includes a plurality of clip teeth configured for engagement with the plurality of spool teeth.

18 Claims, 7 Drawing Sheets

(56) References Cited

U.S. PATENT DOCUMENTS

| | | | |
|---|---|---|---|
| 6,626,060 B2 * | 9/2003 | Matsuo | F16C 1/101 74/501.5 R |
| 7,188,545 B2 | 3/2007 | Nagle et al. | |
| 7,334,498 B2 * | 2/2008 | Yokomori | F16C 1/226 254/231 |
| 8,215,202 B2 | 7/2012 | Tomandl | |
| 9,695,865 B2 | 7/2017 | Snodgrass | |
| 2009/0175676 A1 * | 7/2009 | Ficyk | F16C 1/101 403/123 |
| 2012/0174349 A1 * | 7/2012 | Fannon | E05B 79/20 24/457 |

* cited by examiner

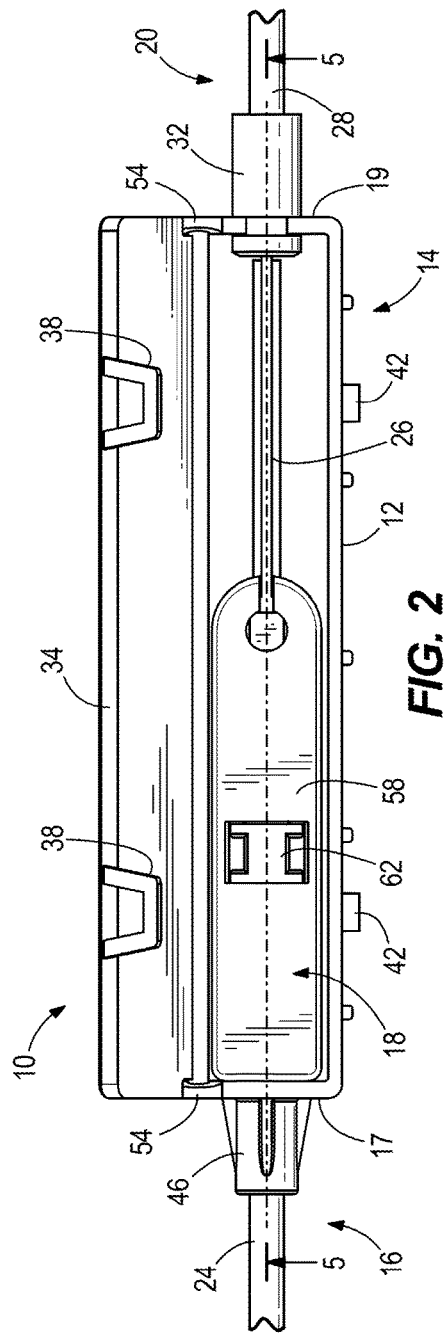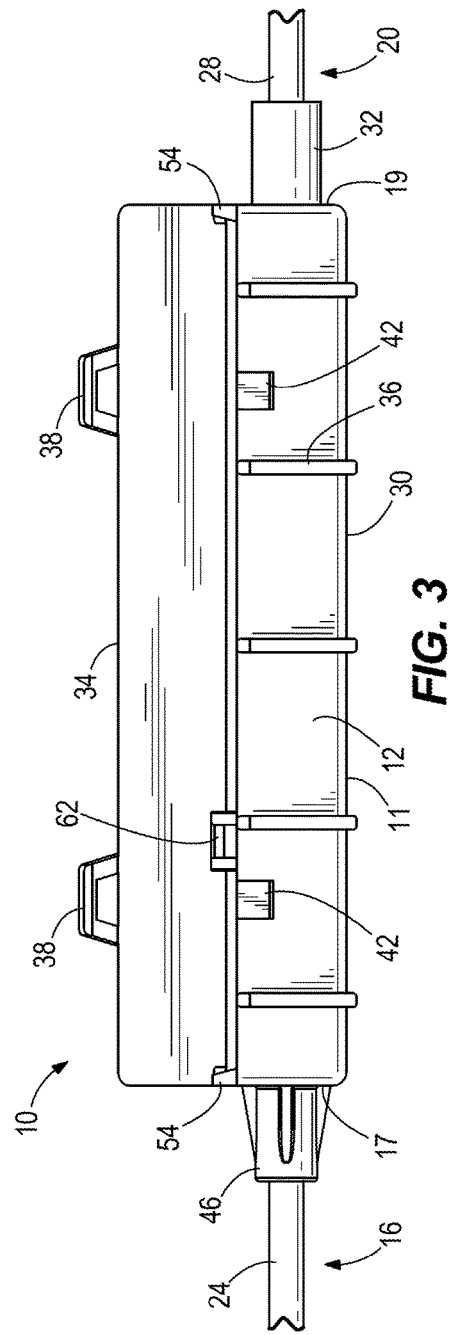

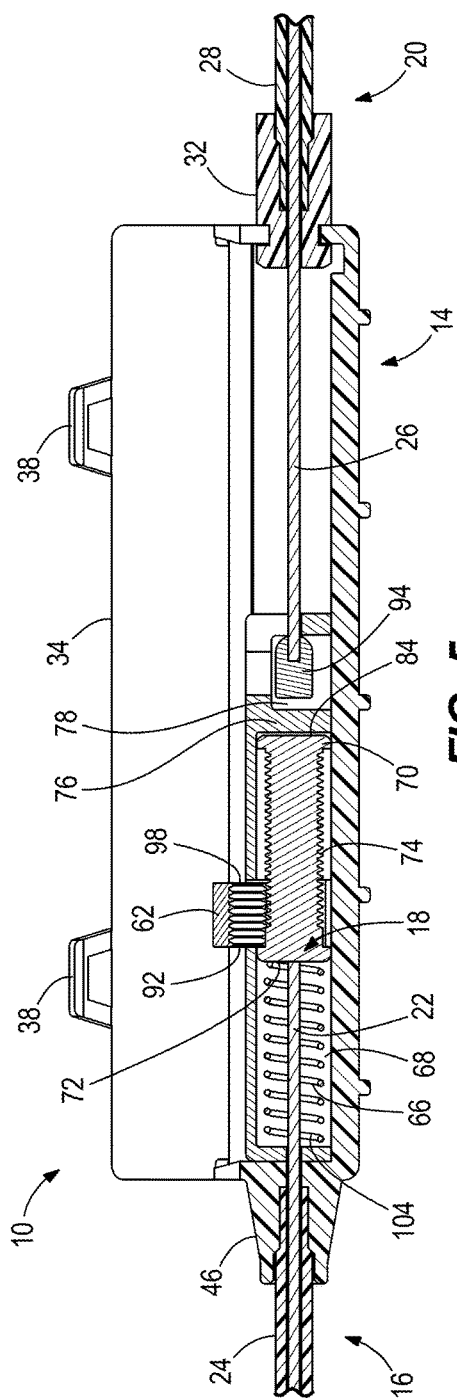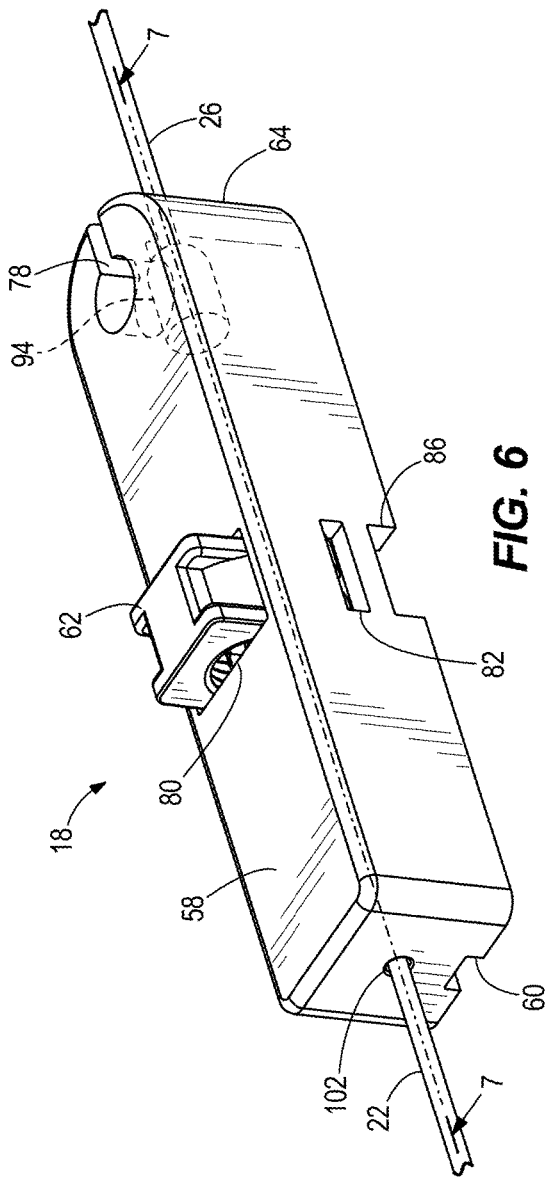

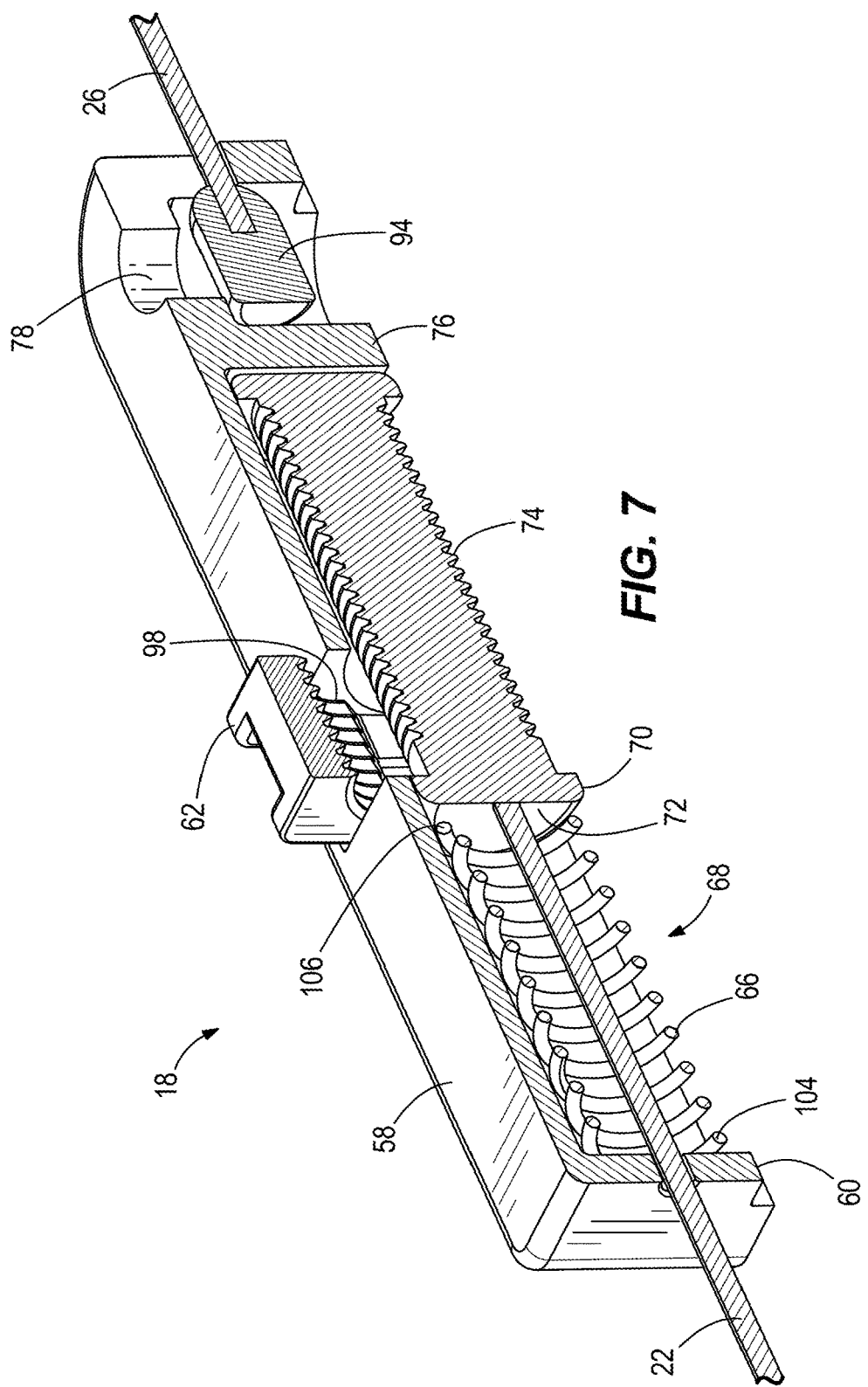

CABLE TENSION ADJUSTER

BACKGROUND

The present disclosure relates to a cable tension adjuster for adjusting tension between two cable sections having outer jackets and inner cables.

SUMMARY

In one aspect, a cable tension adjuster for adjusting tension between two cable sections includes a junction box having a housing. A slider is disposable within the junction box and includes a first slider wall, a cable coupling port opposite the first slider wall configured for coupling a first inner cable of a first cable section, and a second slider wall adjacent the cable coupling port. The first and second slider walls together partially define an internal cavity therebetween. A spool is disposable within the internal cavity and is couplable to a second inner cable of a second cable section. The spool includes a plurality of spool teeth. A biasing member is disposable within the internal cavity between the first slider wall and the spool. A locking clip is disposable within an aperture formed in the slider and includes a plurality of clip teeth configured for engagement with the plurality of spool teeth.

In another aspect, a cable tension adjuster for adjusting tension between two cable sections includes a container and a slider disposable within the container. The slider has a first slider wall and a second slider wall, wherein the first and second slider walls define an internal cavity therebetween. The slider also includes a cable coupling port configured for coupling a first cable section. A spool is disposable within the internal cavity and couplable to a second cable section. A biasing member is disposable within the internal cavity adjacent the spool. A locking clip is cooperatively couplable to the slider and configured for engagement with the spool between a first position in which the spool is affixed to the slider and a second position in which the spool is not affixed to the slider.

In yet another aspect, a cable tension adjuster for adjusting tension between two cable sections includes a junction box having a housing. A slider is positioned within the junction box and includes a first slider wall, a cable coupling port formed in a second slider wall opposite the first slider wall, and a third slider wall between the first and second slider walls. The first and second slider walls together partially define an internal cavity therebetween. A spool is positioned within the internal cavity and coupled to an inner cable of a cable section. The spool presents a circumferential exterior, a portion of which includes integrally formed spool teeth. A biasing member in the form of a coil spring is positioned within the internal cavity between the first slider wall and the spool and circumscribes the inner cable. A locking clip is disposed within an aperture formed in the slider and includes clip teeth on an inner surface thereof. The clip teeth are configured for engagement with the spool teeth.

Other aspects of the disclosure will become apparent by consideration of the detailed description and accompanying drawings.

BRIEF DESCRIPTION OF THE DRAWINGS

FIG. 2 is a top plan view of the tension adjuster of FIG. 1.

FIG. 3 is a side elevation view of the tension adjuster of FIG. 1.

FIG. 5 is a side cross-sectional view of the tension adjuster of FIG. 1 taken along line 5-5 of FIG. 2.

FIG. 6 is a perspective view of a tensioner subassembly of the tension adjuster of FIG. 1.

FIG. 7 is a cross-sectional perspective view of the tensioner subassembly of FIG. 6 taken along line 7-7 of FIG. 6.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways.

Figure 1:
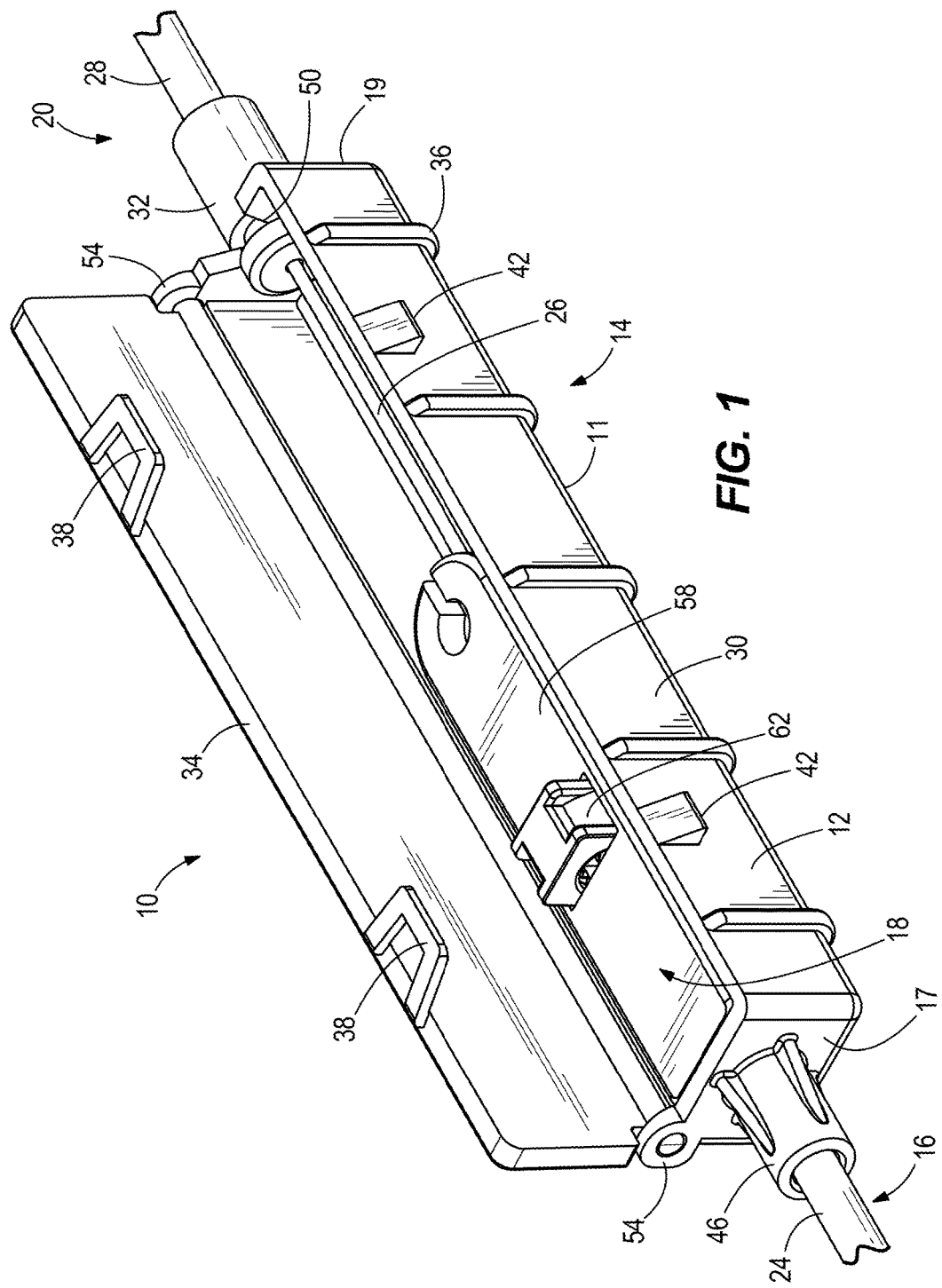
FIG. 1 is a perspective view of a cable tension adjuster in accordance with one embodiment of the present disclosure.
Figure 4:
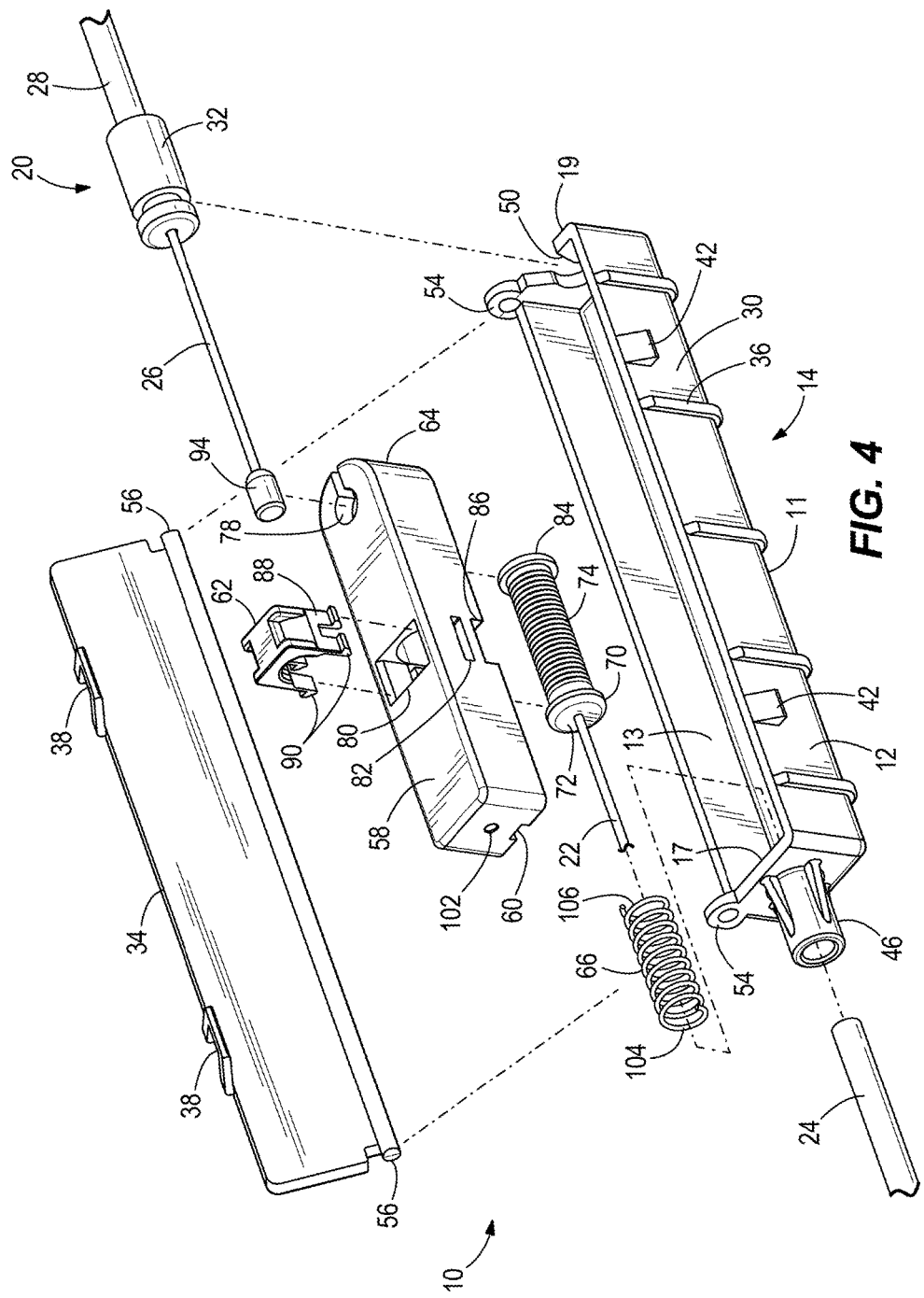
FIG. 4 is an exploded perspective view of the tension adjuster of FIG. 1
Figure 8:
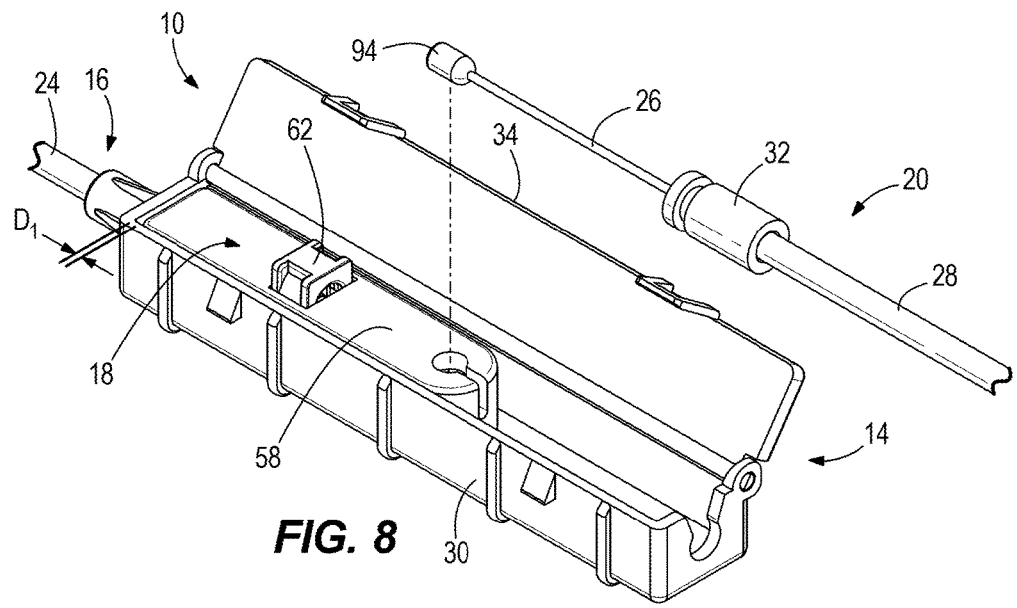
FIG. 8 is a perspective view of the tension adjuster of FIG. 1 illustrating the tensioner subassembly disengaged from a second cable.

FIG. 1 illustrates a cable tension adjuster 10 according to one embodiment of the disclosure. The tension adjuster 10 is operable to adjust or remove slack between first and second cable sections 16 and 20 mechanically interconnecting a user input device with an output device. The cable sections 16 and 20 include outer jackets 24 and 28 and inner cables 22 (see FIG. 5) and 26 capable of movement relative to the outer jackets 24 and 28, respectively. Cable sections 16, 20 may be, for example, Bowden cables. Jacket 28 includes a grooved barrel 32 or similar coupling component operatively affixed thereto.

With reference to FIGS. 1-4, the tension adjuster 10 includes a tensioner subassembly 18 housed within a container or junction box 14.

The junction box 14 includes a housing 30 having a bottom 11, two sidewalls 12, 13, two end walls 17, 19, and an optional lid 34 pivotably connected by hinges 54. Tabs 42 are disposed about sidewall 12 of the housing 30 for engagement with clips 38 on the lid 34. An inlet port 46 protrudes from the first end wall 17 and is configured to receive the first outer jacket 24 of the first cable section 16. A cable recess 50 is disposed at or otherwise formed in the second end wall 19 opposite the first end wall 17 and is configured to receive the barrel 32 of outer jacket 28. One or more ribs 36 may be disposed on the housing 30 and/or the lid 34 for structural reinforcement.

FIGS. 4-7 illustrate in further detail the tensioner subassembly 18. The subassembly 18 includes a slider 58 that houses a spool 70, a biasing member 66 (e.g., a coil spring), and cooperates with a locking clip 62.

The locking clip 62 includes a depression surface 88 from which extend generally parallel locking tabs 90. The under-side or inner surface or circumference 92 of the locking clip 62 presents a plurality of clip teeth 98 formed therein.

The slider 58 includes a center aperture 80 configured to receive the locking clip 62 and first and second locking slots 82 and 86 disposed adjacent the center aperture 80 to receive the locking tabs 90 on the locking clip 62, as will be further explained below. A slider end wall 60 includes a cable aperture 102 through which the first inner cable 22 passes. The slider 58 further includes a nipple or coupling port 78 formed partially within a slider end wall 64 opposite the slider end wall 60 and configured to receive a nipple 94 coupled to the end of the second inner cable 26. A slider internal wall 76 (FIG. 7) of the slider 58 is located between slider end walls 60, 64 and in some embodiments partially defines the coupling port 78. Together, the slider end wall 60 and the slider internal wall 76 define an internal cavity 68 therebetween that houses the spool 70, the biasing member 66, and a portion of the first inner cable 22.

The spool 70 is coupled to the first inner cable 22 and includes spool teeth 74 disposed about an exterior surface or circumference of the spool 70, or otherwise formed therein. The spool teeth 74 are sized and spaced to engage the corresponding clip teeth 98 (FIG. 5). The spool further includes a first wall 72 (FIG. 7) and an opposing second wall 84.

With reference to FIG. 5, the biasing member 66 is disposed within the internal cavity 68 of the slider 58 and circumscribes a portion of the first inner cable 22. A first spring end 104 of the biasing member 66 abuts the slider end wall 60, and a second spring end 106 of the biasing member 66 abuts the first wall 72 of the spool 70.

FIGS. 8-11 depict the tension adjuster 10 in operation. Beginning with FIG. 8, the tension adjuster 10 is depicted with the tensioner subassembly 18 positioned within the junction box 14 and the second cable section 20 not yet connected. The slider 58 is located at a first position adjacent the first end wall 17 of the housing 30, such that a distance D1 measured between the first end wall 17 and the slider end wall 60 is 0 (zero) mm or close to 0 (zero) mm. Within the slider 58, the biasing member 66 biases the spool 70 away from the slider end wall 60 and toward the slider internal wall 76. Depending on the tension in cable section 16, the second wall 84 may abut the slider internal wall 76.

Figure 9:
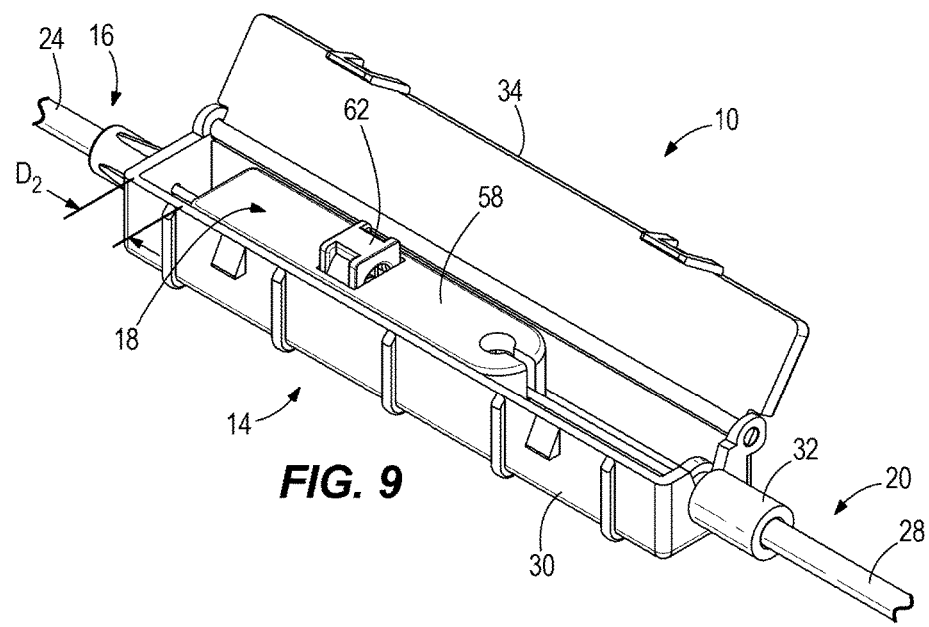
FIG. 9 is a perspective view of the tension adjuster of FIG. 1 illustrating the tensioner subassembly engaged with a second cable and in an unlocked position.

Referring to FIG. 9, the tension adjuster 10 is depicted with the second cable section 20 connected to the tension subassembly 18. Specifically, the nipple 94 of the second inner cable 26 is seated within the coupling port 78 of the slider 58, and the barrel 32 is seated within the cable recess 50 of the housing 30. With the second cable section 20 connected, the second inner cable 26 is fixedly connected to the slider 58, while the second outer jacket 28 is fixedly connected to the junction box 14 such that the second inner cable 26 and slider 58 can translate relative to the second outer jacket 28 and to the junction box 14.

Tension in the second cable section 20 tends to pull the slider 58 away from the first end wall 17 and toward the second end wall 19. As the slider 58 is pulled toward the second end wall 19, tension in the first cable section 16 increases due to the interaction of the slider end wall 60 and the biasing member 66, which acts on the spool first wall 72. If the tensions in the first and second cable sections 16, 20 are greater than the spring force of the biasing member 66 at a given spring extension, the biasing member 66 compresses, resulting in relative movement between the slider 58 and the spool 70. Eventually equilibrium is reached between the tensions in the first and second cable sections 16 and 20, at which point the slider 58 ceases to move relative to the junction box 14. At equilibrium, the distance D2 between the first end wall 17 and the slider end wall 60 is greater than the distance D1.

With continued reference to FIG. 9, the tension adjuster 10 is depicted at equilibrium with the locking clip in a first or unlocked position. In the unlocked position, the locking tabs 90 of the locking clip 62 engage the first slots 82 of the slider 58 to retain the locking clip 62 in the unlocked position. The clip teeth 98 do not engage the spool teeth 74 when the locking clip 62 is in the unlocked position.

Figure 10:
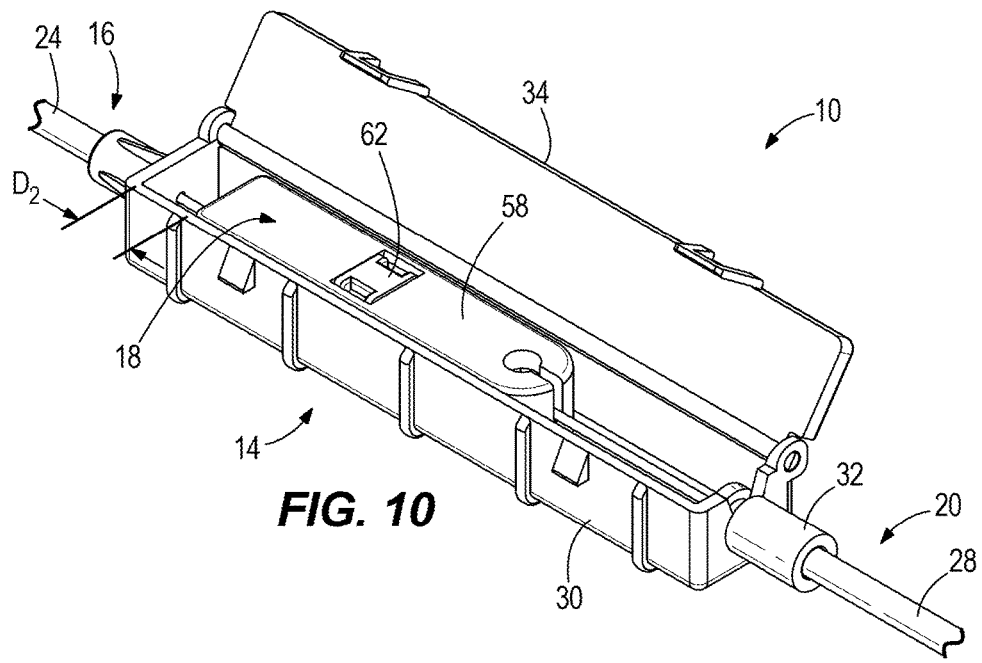
FIG. 10 is a perspective view of the tension adjuster of FIG. 1 illustrating the tensioner subassembly engaged with a second cable and in a locked position.

With reference to FIG. 10, with equilibrium established between the first and second cable sections 16 and 20, the locking clip 62 is manually depressed to a second or locked position to lock the spool 70 in place relative to the slider 58. In the locked position, the locking tabs 90 of the locking clip 62 engage the second slots 86 of the slider 58 to retain the locking clip 62 in the locked position. At least some of the clip teeth 98 engage at least some of the spool teeth 74 to restrain movement between the slider 58 and the spool 70. In the locked position, cables 16, 20 are therefore operatively coupled together and move in unison. Any increase or decrease in tension in either cable section 16, 20 results in movement of the slider 58 relative to the junction box 14. In other words, movement of the first inner cable 22 at the user input device is mechanically translated through the first cable section 16, the tension adjuster 10, and the second cable section 20 until the movement is output at the output device.

Figure 11:
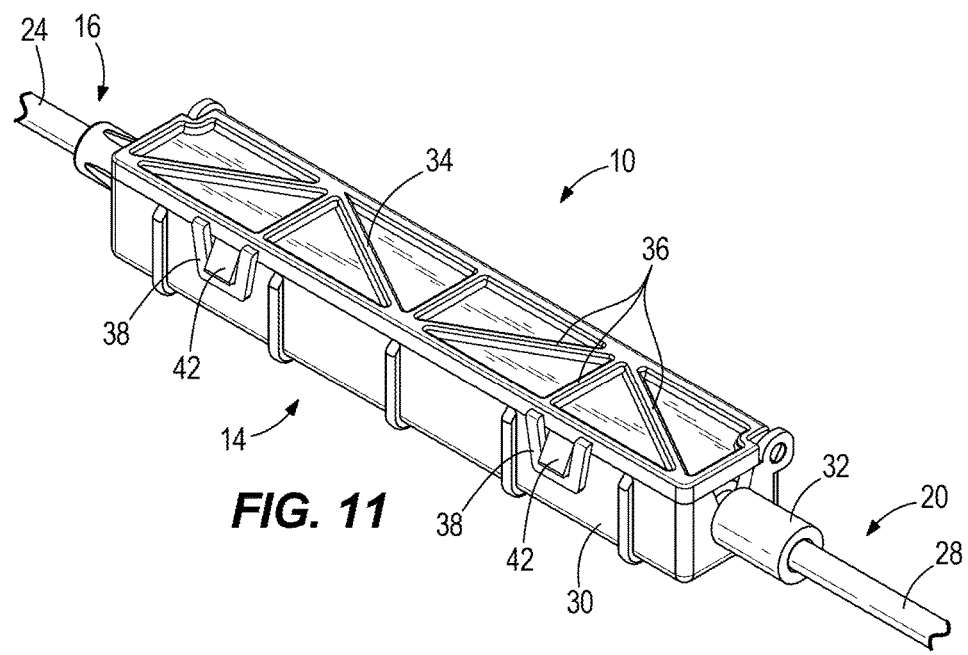
FIG. 11 is a perspective view of the tension adjuster of FIG. 10 illustrating a lid of the junction box in a closed position.

FIG. 11 depicts the tension adjuster 10 with the lid 34 in a closed position. The clips 38 of the lid 34 engage the tabs 42 of the housing 30 to secure the lid 34 in the closed position. Additionally, due to the position of the closed lid 34 relative to the locking clip 62, the closed lid 34 prevents the locking clip 62 from repositioning to the unlocked position (closing the lid 34 may also operate to move the locking clip 62 from the unlocked to the locked position). The tensioner subassembly 18 is completely enclosed within the junction box 14 when the lid 34 is closed, and the slider 58 is able to translate within the closed junction box 14 in response to cable operation. The junction box 14 further protects the slider 58 from potential obstructions that may otherwise impede movement of the slider 58.

In some embodiments, the full configuration of the junction box 14 need not be entirely present. Rather, a partially enclosed space or a platform may be substituted within or on which the slider 58 may operate as previously described.

Thus, the disclosure provides, among other things, a cable tension adjuster. Various features and advantages of the disclosure are set forth in the following claims.

What is claimed is:

1. A cable tension adjuster for adjusting tension between two cable sections, the cable tension adjuster comprising:
    a junction box including a housing;
    a slider disposable within the junction box, the slider including a first slider wall, a cable coupling port opposite the first slider wall configured for coupling a first inner cable of a first cable section, and a second slider wall adjacent the cable coupling port, the first and second slider walls together partially defining an internal cavity therebetween;
    a spool disposable within the internal cavity, the spool being couplable to a second inner cable of a second cable section and including a plurality of spool teeth;
    a biasing member disposable within the internal cavity between the first slider wall and the spool; and a locking clip disposable within an aperture formed in the slider and including a plurality of clip teeth configured for engagement with the plurality of spool teeth.

2. The cable tension adjuster of claim 1, wherein the housing comprises a first end wall, a second end wall opposite the first end wall, a cable port protruding from the first end wall, and a cable recess disposed in the second end wall.

3. The cable tension adjuster of claim 1, wherein the junction box includes a lid hingedly connected to the housing and moveable between an open position and a closed position.

4. The cable tension adjuster of claim 2, wherein the second cable section includes an outer jacket, wherein the cable port is configured to receive the outer jacket, and wherein the cable recess is configured to receive an outer jacket component of the first cable section.

5. The cable tension adjuster of claim 4, wherein the first inner cable terminates in a cable nipple, and wherein the cable coupling port of the slider is configured to receive the cable nipple to fix the slider to the first inner cable.

6. The cable tension adjuster of claim 1, wherein the plurality of spool teeth are disposed circumferentially about an exterior circumference of the spool, and wherein the locking clip includes an interior circumference and the plurality of clip teeth are disposed on the interior circumference.

7. The cable tension adjuster of claim 1, wherein the locking clip is moveable between an unlocked position in which the slider and the spool are not engaged and a locked position in which the slider and the spool are engaged.

8. The cable tension adjuster of claim 7, wherein the locking clip includes a locking tab and the slider includes a first slot and a second slot, wherein the locking tab is configured to engage the first slot to retain the locking clip in the central aperture in the unlocked position, and wherein the locking tab is configured to engage the second slot to retain the locking clip in the locked position.

9. The cable tension adjuster of claim 7, wherein the junction box includes a lid configured to maintain the locking clip in the locked position.

10. The cable tension adjuster of claim 1, wherein the biasing member is a coil spring configured to circumscribe the second inner cable within the internal cavity.

11. The cable tension adjuster of claim 1, wherein the first slider wall includes a cable aperture permitting the second inner cable to pass through the first slider wall.

12. A cable tension adjuster for adjusting tension between two cable sections, the cable tension adjuster comprising:
a container;
a slider disposable within the container, the slider including
a first slider wall,
a second slider wall, wherein the first and second slider walls define an internal cavity therebetween, and
a cable coupling port configured for coupling a first cable section;
a spool disposable within the internal cavity, the spool couplable to a second cable section;
a biasing member disposable within the internal cavity adjacent the spool; and
a locking clip cooperatively couplable to the slider and configured for engagement with the spool between a first position in which the spool is affixed to the slider and a second position in which the spool is not affixed to the slider.

13. The cable tension adjuster of claim 12, wherein the container comprises a housing with a lid.

14. The cable tension adjuster of claim 12, wherein the biasing member is a coil spring configured to circumscribe a portion of the second cable section within the internal cavity.

15. The cable tension adjuster of claim 12, wherein the spool presents a plurality of spool teeth disposed circumferentially about an exterior circumference thereof, and wherein the locking clip includes an interior circumference presenting a plurality of clip teeth configured for engagement with the plurality of spool teeth.

16. The cable tension adjuster of claim 12, wherein the locking clip includes a locking tab and the slider includes a locking slot, wherein the locking tab is configured to engage the locking slot to retain the locking clip in the first position.

17. A cable tension adjuster for adjusting tension between two cable sections, the cable tension adjuster comprising:
a junction box including a housing;
a slider positioned within the junction box, the slider including a first slider wall, a cable coupling port formed in a second slider wall opposite the first slider wall, and a third slider wall between the first and second slider walls, the first and third slider walls together partially defining an internal cavity therebetween;
a spool positioned within the internal cavity and coupled to an inner cable of a cable section, the spool presenting a circumferential exterior, a portion of which includes spool teeth;
a biasing member in the form of a coil spring positioned within the internal cavity between the first slider wall and the spool and circumscribing the inner cable; and
a locking clip disposed within an aperture formed in the slider and including clip teeth on an inner surface thereof, the clip teeth configured for engagement with the spool teeth.

18. The cable tension adjuster of claim 17, wherein the locking clip is configured for engagement with the spool between a first position in which the clip teeth engage the spool teeth and a second position in which the clip teeth do not engage the spool teeth.

* * * * *